(12) United States Patent
Rho et al.

(10) Patent No.: US 8,267,374 B2
(45) Date of Patent: Sep. 18, 2012

(54) MULTI-TURN HYDRAULIC ACTUATOR

(75) Inventors: Byoung Hoo Rho, Daejeon (KR); Hee Goo Sim, Daejeon (KR); Mun Su Bok, Daejeon (KR); Jae Chul Lee, Daejeon (KR); Po Young Kim, Daejeon (KR)

(73) Assignee: RPM Tech Co., Ltd., Daejeon (KR)

( * ) Notice: Subject to any disclaimer, the term of this patent is extended or adjusted under 35 U.S.C. 154(b) by 475 days.

(21) Appl. No.: 12/551,693

(22) Filed: Sep. 1, 2009

(65) Prior Publication Data

US 2010/0126307 A1  May 27, 2010

(30) Foreign Application Priority Data

Sep. 29, 2008  (KR) .................. 10-2008-0095532

(51) Int. Cl.
*F16K 31/05* (2006.01)
(52) U.S. Cl. .............. 251/129.03; 251/249.5; 137/554
(58) Field of Classification Search ............... 251/14, 251/129.03, 249.5, 65; 137/554
See application file for complete search history.

(56) References Cited

U.S. PATENT DOCUMENTS

| | | | |
|---|---|---|---|
| 2,902,885 A * | 9/1959 | Wright ................ | 74/625 |
| 4,130,030 A * | 12/1978 | Stratienko ............ | 74/625 |
| 4,899,637 A | 2/1990 | Caruso | |
| 5,224,683 A | 7/1993 | Richeson | |
| 5,937,988 A | 8/1999 | Otto et al. | |
| 7,195,033 B2 * | 3/2007 | Mayeu et al. ........ | 137/554 |
| 7,264,017 B2 * | 9/2007 | Denike et al. ........ | 137/495 |
| 2005/0011556 A1 * | 1/2005 | Dudzik et al. ........ | 137/554 |
| 2007/0039797 A1 | 2/2007 | Yoshioka | |

* cited by examiner

*Primary Examiner* — Eric Keasel
*Assistant Examiner* — Time Aigbe
(74) *Attorney, Agent, or Firm* — Rabin & Berdo, PC

(57) ABSTRACT

There is provided a multi-turn hydraulic actuator used to open/close a passageway in ground and sea industries including general industrial machines, oil refineries and chemical plants and power generating plants, among others, and more particularly, a multi-turn hydraulic actuator comprising: a hydraulic motor and a decelerator, among others, whereby high torque is efficiently obtained by using low electric power, compared to a conventional electric actuator, and whereby an operation part and a drive part are freely attached to/detached from at a user's necessity.

9 Claims, 4 Drawing Sheets

MULTI-TURN HYDRAULIC ACTUATOR

CROSS-REFERENCE TO RELATED PATENT APPLICATION

This application claims the benefit of Korean Patent Application No. 10-2008-0095532, filed on Sep. 29, 2008, in the Korean Intellectual Property Office, the disclosure of which is incorporated herein in its entirety by reference.

BACKGROUND OF THE INVENTION

1. Field of the Invention

The present invention relates to a multi-turn hydraulic actuator used to open/close a passageway in the ground and sea industries including general industrial machines, oil refineries and chemical plants, and power generating plants, among others, and more particularly, a technical field in which an actuator comprising a hydraulic motor and a decelerator is used to control the opening/closing of a valve which controls the flow of a fluid flowing through a path of a conduit, or a lock which is installed at a passageway.

2. Description of the Related Art

In general, major types of valve driving systems include a butterfly valve, a gate valve and a plug valve, among others, according to valve forms. Each valve is automatically driven by a 90 degree-turn or multi-turn actuator suitably selected according to use-environments. Examples of actuators include electric actuators, pneumatic actuators and hydraulic actuators by forms. Two functions, i.e., a stabilized actuation performance and a semi-permanent life span, are recognized as the most important factors in the actuators.

To control a valve installed in an industrial conduit or a lock installed in a passageway, a shaft of the valve or lock needs to be rotated, to perform the opening/closing operation of the valve or lock. The valve performs its operation generally by using an actuator which is controlled remotely or in the spot.

A conventional multi-turn electric actuator generally used comprises: a control unit including a 3-phase inverter converting single phase power into 3-phase power; a 3-phase electric motor operated by the control unit; a multi-unit with a rotation shaft installed perpendicularly to be rotated in either direction by the driving of the 3-phase electric motor; and a passageway switching unit for opening/closing a passageway.

In the aforementioned multi-turn electric actuator, when electric power is applied to the control unit including the 3-phase inverter, the 3-phase electric motor is driven. The motive power generated in the 3-phase electric motor is transmitted to a worm gear through a gear inside the multi-unit, thereby ultimately driving a drive block of the passageway switching unit installed at an end of the rotation shaft. Consequently, the opening/closing of the valve is controlled by the torque.

Further, the conventional multi-turn electric actuator is structured to monitor the operation of the gear inside the multi-unit, to perceive the extent of opening the valve and the drive of the actuator. For this purpose, an analog detection method and a digital detection method are used. In the former, an additional shaft is directly connected to the gear, to detect the number of times of rotation of the shaft by using variable resistance. In the latter, the number of times of rotation of the shaft is detected by using a sensor.

In a manual method of manually operating the conventional multi-turn electric actuator, a manual switch lever is rotated by human power, to apply a change to a combination of the gear inside the multi-unit, thereby changing an automatic mode to a manual mode.

When using the manual switch lever to change the mode of the actuator to the manual mode, sufficient rotational radius and space are required to operate the manual switch lever. Moreover, since all of the 3-phase electric motor, control unit, multi-unit, passageway switching unit and terminal unit forming the multi-turn electric actuator are structured in a single unit, it is impossible to install the manual switch lever in such a small space.

Further, in the analog detection method to perceive the extent of opening the valve and the drive of the actuator, an assembling process is very complicated since many gears are combined. Moreover, since the gear combination needs to be mechanically changed in order to set or correct a display of the extent of opening, it is necessary to open a cover. Therefore, this is regarded as a very annoying factor.

Further, in the digital detection method, one central processing unit of high-capacity is included in the control unit, to be used for the control and communication of the actuator. In addition, the central processing unit is used for a sensor of detecting the extent of opening. Therefore, high standby electric power is consumed at the moment when the actuator is not driven.

SUMMARY OF THE INVENTION

The present invention provides a multi-turn hydraulic actuator which solves the above problems of a conventional multi-turn electric actuator needing to be improved and has the new concepts making it easy to be installed and operated even in a limited space and making it possible to minimize the use of electric power.

It is therefore an object of the present invention to provide a multi-turn hydraulic actuator which uses a hydraulic motor, thereby using low electric power, significantly improving outputs and realizing fast response characteristics; which is formed in an assembly structure, thereby making it possible to detach/attach an operation part and a drive part so that only the drive part is installed in a limited space or in the spot where it is inconvenient to approach, and the operation part is separately installed at a desired place to be easily operated; which uses a manual mode switch to be input by a button, thereby minimizing a space for using the product; which uses a hydraulic pressure generator, thereby minimizing consumption of driving power; and which additionally includes a low-power processor needed for detecting the extent of opening, thereby minimizing standby electric power.

According to an aspect of the present invention, there is provided a multi-turn hydraulic actuator comprising: an operation part and a drive part being separately formed to be assembled/disassembled, wherein the operation part comprises: a hydraulic pressure generator including a motor and a pump being formed together in a single unit, and the drive part transmits a rotational force of a hydraulic motor to a decelerator and rotates a driving shaft forwardly/backwardly by the decelerated force.

The multi-turn hydraulic actuator further comprises: a manual mode switch and a manual handle, wherein the manual mode switch is installed between the hydraulic motor and the decelerator, to change the mode of the decelerator so as to be manually operated, and the manual handle is installed at the other end of the decelerator, to manually operate the decelerator.

The multi-turn hydraulic actuator further comprises: a non-touch digital detector for detecting the extent of opening, wherein the non-touch digital detector comprises: a number of magnets for detecting the extent of opening, installed at a worm shaft forming the decelerator; and hole sensors installed to perceive signals of the magnets, thereby detecting a rotational direction of the worm shaft and the extent of opening.

BRIEF DESCRIPTION OF THE DRAWINGS

The above and other features and advantages of the present invention will become more apparent by describing in detail exemplary embodiments thereof with reference to the attached drawings in which.

[Brief description of reference numbers of major elements]

| A: operation part | B: drive part |
|---|---|
| 10: hydraulic pressure generator | 11: electric motor |
| 20: housing of the drive part | 25: detector receiving part |
| 30: hydraulic motor | 33, 63, 73, 93: rotation pins |
| 34: motor disk | 40: decelerator |
| 43: worm shaft | 44: driving shaft |
| 45: worm wheel | 50: moving shaft |
| 60: automatic disk | 70: manual disk |
| 75: magnet | 80: manual mode switch |
| 82: elastic member | 83: pusher |
| 84: switch shaft | 84b: pivot piece |
| 85: release bar | 87: fixing ball |
| 89: ball receiving groove | 90: manual handle |
| 100: non-touch digital detector for detecting the extent of opening | |
| 100-1: magnet for detecting the extent of opening | |
| 101: hole sensor | 102: low-power processor |

DETAILED DESCRIPTION OF THE INVENTION

The present invention will now be described more fully hereinafter with reference to the accompanying drawings, in which preferred embodiments of the invention are shown.

As used herein, the singular forms "a", "an" and "the" are intended to include the plural forms as well, unless the context clearly indicates otherwise.

Figure 1:
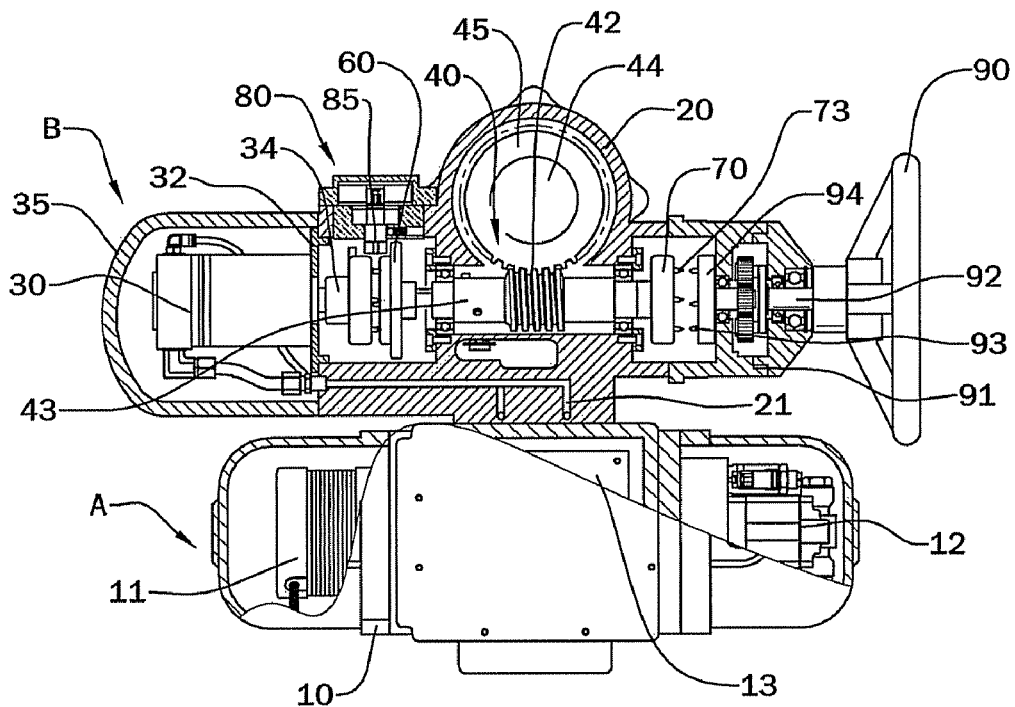
FIG. 1 is a partial plan view illustrating a multi-turn hydraulic actuator according to an embodiment of the present invention.

As illustrated in FIG. 1, a multi-turn hydraulic actuator according to the present invention is characterized in that hydraulic pressure generated by a hydraulic pressure generator 10 is supplied to a hydraulic motor 30 through a hydraulic channel 21 formed in a housing 20 of a drive part B or a separate hydraulic hose so that the hydraulic motor 30 is driven, a rotational force of the hydraulic motor 30 is transmitted to a worm shaft of a decelerator 40 directly connected to the hydraulic motor 30 so that a driving shaft 44 is rotated at a reduced speed, and the rotation of the worm shaft 43 is selectively manually operated by using a manual handle 90 and setting a manual mode switch 80.

An outline of the whole technical constitution of a multi-turn hydraulic actuator according to a preferred embodiment of the present invention to achieve the aforementioned characteristics will be described with reference to FIGS. 1 through 4. The multi-turn hydraulic actuator has the correlative constitution comprising: a hydraulic motor 30 positioned at a front end of a housing 20 of a drive part B and operatively rotated by hydraulic pressure generated by a hydraulic pressure generator 10; a decelerator 40 including a worm 42, a worm shaft 43, a driving shaft 44 and a worm wheel 45, wherein the worm shaft 43 with the worm 42 is rotatably installed in the middle of the housing 20 of the drive part B, and the worm wheel 45 connected to the driving shaft 44 in a single unit is engaged with the worm 42, transmitting a rotational force of the worm 42 to the driving shaft 44 at a reduced speed; a moving shaft 50 operatively connected to the worm shaft 43 so as to be rotatable by penetrating the worm shaft 43 and to selectively slide in either direction; an automatic disk 60 connected to one end of the moving shaft 50 and being operatively rotated by a number of rotation pins 63 selectively meeting a number of rotation pins 33 of a motor disk 34, respectively; a manual disk 70 connected to the other end of the moving shaft 50; a manual mode switch 80 wherein a release bar 85 positioned between the motor disk 34 and the automatic disk 60 pivots by operating a manual mode button 83c, so that the automatic disk 60 is moved so as not to interfere with the motor disk 34 and the worm shaft 43 is switched so as to be manually operated; and a manual handle 90 installed at the other end of the housing 20 of the drive part B, wherein rotation pins 93 of a handle disk 94 positioned at a front end of a handle shaft 92 selectively meet rotation pins 73 of the manual disk 70, respectively, thereby making the worm shaft 43 so as to be manually rotatable.

Below, the multi-turn hydraulic actuator having the constitution outlined above will be described, in more detail, to be easily carried out.

The hydraulic pressure generator 10 forming an operation part A in the multi-turn hydraulic actuator according to the present invention generates high hydraulic pressure. As illustrated in FIG. 1, a BLDC motor or electric motor 11 having high power efficiency is attached to one side of the hydraulic pressure generator 10. The hydraulic pressure is generated by a gear pump 12 directly connected to the electric motor 11. A controller 13 is provided at an upper position in the middle of the hydraulic pressure generator 10. The controller 13 has the functions of changing a speed of the hydraulic motor 30 and a direction of a hydraulic fluid and stopping driving of the electric motor 11, by controlling the operation of the hydraulic pressure generator 10.

The controller 13 does not need to be installed in the operation part A. When it is suitable to install the controller 13 in the drive part B by considering the conditions of the spot or the structural conditions of the operation part A and drive part B, the controller 13 may be installed in the drive part B.

The hydraulic pressure generator 10 is attachable to or detachable from the housing 20 of the drive part B directly connected to a valve installed at a conduit or a lock of a hydraulic channel. The hydraulic pressure generator 10 may be installed at the housing 20 of the drive part B in a single unit or it may be installed at a third place, separately from the housing 20 of the drive part B, without any restriction with respect to an installation space. Therefore, the hydraulic pressure generator 10 is highly applicable in use.

Figure 2:
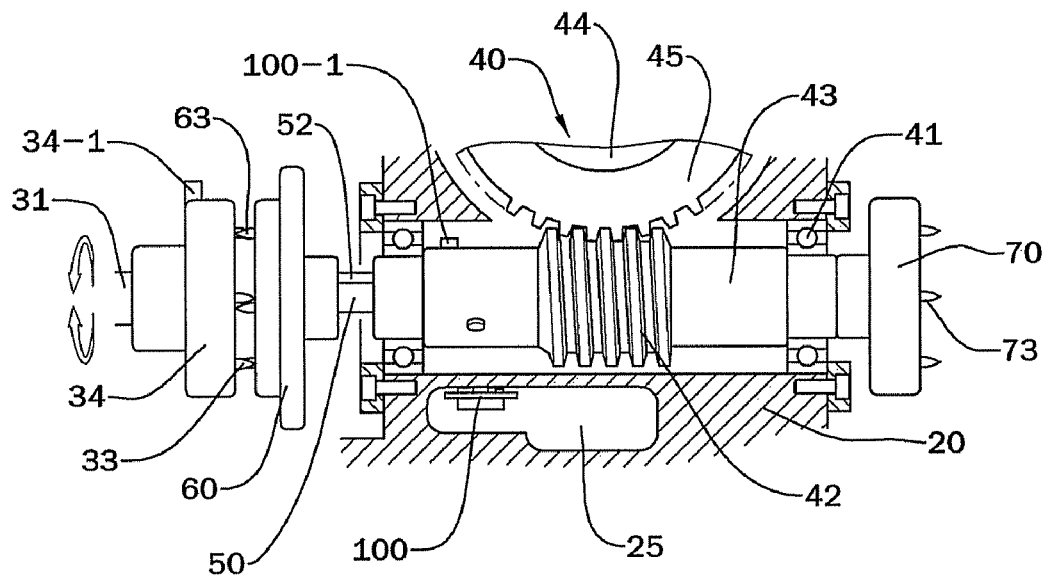
FIG. 2 is an enlarged sectional plan view illustrating a motor disk, an automatic disk and a decelerator being assembled together in the multi-turn hydraulic actuator.

When the hydraulic pressure is generated by the gear pump 12, it is supplied to the hydraulic motor 30 through a hydraulic channel 21 formed in the housing 20 of the drive part B or to the hydraulic motor 30 through a separate hydraulic hose, so that a motor shaft 31 of the hydraulic motor 30 generates the rotational force in forward/backward directions as illustrated in FIG. 2.

The hydraulic motor 30 is fixedly installed at a motor fixing plate 32 attached to a front end of one end of the housing 20 of the drive part B. A motor disk 34 to which a number of rotation pins 33 are attached in a radial shape is connected to the motor shaft 31 in a single unit. The motor disk 34 operates to rotate in the forward/backward directions as the hydraulic motor 30 operates. A motor casing 35 is installed at the outside of the hydraulic motor 30 and covers the hydraulic motor 30, thereby protecting the hydraulic motor 30 from any external forces.

The hydraulic motor 30 generates high motive power by using low electric power. Further, as the hydraulic motor 30 uses an incompressible hydraulic fluid, it provides the effect of realizing much faster response characteristics, compared with a conventional electric actuation.

The decelerator 40 is positioned in the middle of the housing 20 of the drive part B. The decelerator 40 reduces a speed of the rotational force of the hydraulic motor 30 and transmits the rotational force to the driving shaft 44 opening/closing the valve and lock. As illustrated in FIG. 2, the decelerator 40 includes the worm shaft 43 rotatably installed in the middle of the housing 20 of the drive part B by bearings 41. The worm 42 is formed about the worm shaft 43. The worm 42 is engaged with the worm wheel 45 connected, in a single unit, to the driving shaft 44 being vertically installed. Therefore, the driving shaft 44 is variously rotated, in the forward/backward directions, at a reduced speed.

In the embodiment of the present invention, the decelerator 40 has the mutually connected constitution of the worm 42 and the worm wheel 45 but it may be realized in a different manner. Any element that is capable of reducing a rotational speed of the hydraulic motor 30 and transmitting the rotational force to the driving shaft 44 at the reduced speed is applicable within the scope of the present invention.

Figure 3:
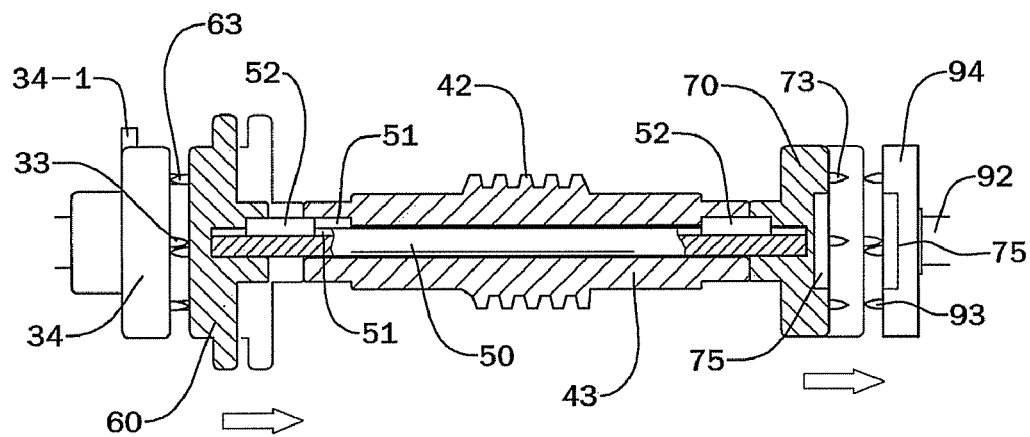
FIG. 3 is a horizontal sectional view illustrating an automatic disk, a moving shaft and a manual disk being moved when the mode of the multi-turn hydraulic actuator is changed to a manual mode.

As illustrated in FIG. 3, the moving shaft 50 penetrates the worm shaft 43 so as to be connected to each other. Key grooves 51 are each formed at both sides of the moving shaft 50 and the worm shaft 43. Each key 52 is installed in each key groove 51, so that the moving shaft 50 is operatively rotated with the worm shaft 43 and is smoothly moved to slide to either side.

That is, the key 52 provides a connecting force between the worm shaft 43 and the moving shaft 50 and guides the moving shaft 50 to be smoothly moved by sliding horizontally.

When the automatic disk 60 is fitted into one side of the moving shaft 50 so as to be in a single unit, the each key 52 is inserted into the key groove formed in an inner diameter of the automatic disk 60. Then, a number of rotation pins 63 formed in a radial shape are attached to the side of the automatic disk 60 facing the motor disk 34 in a single unit.

Thus, when the motor disk 34 is operated to rotate, the rotation pins 33 of the motor disk 34 and the rotation pins 63 of the automatic disk 60 meet each other in contact so as to be rotated. As a result, the rotational force transmitted to the worm 42 rotates the driving shaft 44 at a reduced speed.

As illustrated in FIG. 3, the manual disk 70 is fitted to be connected to the other side of the moving shaft 50. The manual disk 70 functions as a medium to transmit the manual rotational force to the worm shaft 43 by selectively operating the manual handle 90. The key 52 connected to the worm shaft 43 is simultaneously fitted into the key groove formed in an inner diameter of the manual disk 70, so that the manual disk 70 is connected to the other side of the moving shaft 50 in a single unit.

Figure 4:
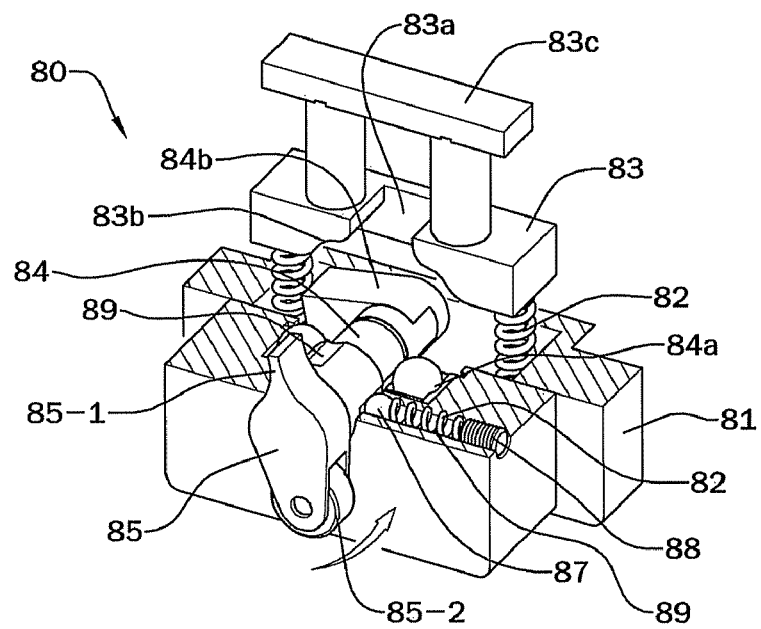
FIG. 4 is a partial perspective view illustrating a manual mode switch in the multi-turn hydraulic actuator.
Figure 5:
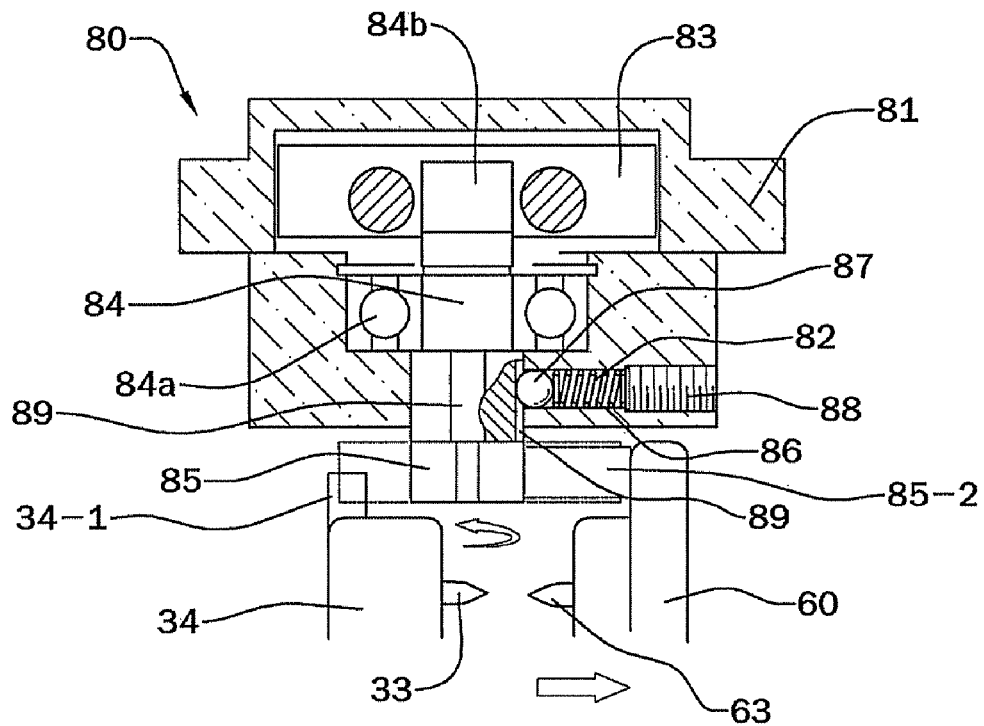
FIG. 5 is a partial horizontal sectional view illustrating the manual mode switch in operation.

In the manual mode switch 80 provided in the multi-turn hydraulic actuator according to the present invention, the release bar 85 positioned between the motor disk 34 and the automatic disk 60 selectively pivots as illustrated in FIGS. 4 and 5, to move the automatic disk 60 so as not to interfere with the motor disk 34 and to manually operate the worm shaft 43.

That is, the manual mode switch 80 increases a distance between the rotation pins 33 of the motor disk 34 and the rotation pins 63 of the automatic disk 60 so that the rotation pins 33 do not interfere with the rotation pins 63, thereby interrupting the motive power so that the rotational force of the hydraulic motor 30 is not transmitted to the worm shaft 43. On the other hand, the manual mode switch 80 decreases a distance between the rotation pins 73 of the manual disk 70 and the rotation pins 93 of the handle disk 94 so that the rotation pins 73 and the rotation pins 93 meet each other, thereby changing the mode to the manual mode so that the actuator is operated by manipulating the manual handle 90.

In the manual mode switch 80, a manual switch housing 81 is installed to be adjacent to the motor disk 34 and the automatic disk 60 through the housing 20 of the drive part B. As illustrated in FIGS. 4 and 5, a pusher 83 is installed in the manual switch housing 81. The pusher 83 is elastically installed by a pair of elastic members 82 positioned vertically as shown, to move up/down.

The pusher 83 includes an interference preventing groove 83a formed in the middle of the pusher 83. The interference preventing groove 83a prevents the pusher 83 from contacting and interfering with a switch shaft 84 when the pusher 83 moves down. Pressing sides 83b are formed by being extended from both lower sides of the interference preventing groove 83a. A manual mode button 83c exposed outward through the manual switch housing 81 is installed on an upper surface of the pusher 83.

The switch shaft 84 penetrating the inside/outside of the manual switch housing 81 is installed in front of the pusher 83, so as to be freely rotatable by a bearing 84a. A pivot piece 84b protrudes in an inner front end of the switch shaft 84. The pivot piece 84b pivots when it is pressed by the pusher 83. The release bar 85 is attached to an outer front end of the switch shaft 84 in a single unit. A switch protrusion 85-1 and a roller 85-2 are respectively positioned at the opposite ends of the release bar 85. The roller 85-2 pushes the automatic disk 60 to be forcibly moved. The release bar 85 is positioned between the motor disk 34 and the automatic disk 60.

When the manual mode button 83c is pressed, the pusher 83 is moved down so that the pressing sides 83b press the pivot piece 84b. The pivot piece 84b pivots around the switch shaft 84, irrespective of its original position, right or left, and simultaneously the release bar 85 is changed to be positioned in a horizontal direction as illustrated in FIG. 5. Then, the roller 85-2 pushes the automatic disk 60 to be forcibly moved, so that the rotation pins 63 of the automatic disk 60 are spaced apart from the rotation pins 33 of the motor disk 34 so as not to interfere with each other, thereby temporarily interrupting the transmission of the motive power.

An elastic element receiving groove 86 is formed in the manual switch housing 81. The elastic element receiving groove 86 is connected to the switch shaft 84 at right angles. After a fixing ball 87 and an elastic member 82 are inserted into the elastic element receiving groove 86, a set screw 88 is used to force the elastic member 82 against the fixing ball 87 so that the fixing ball 87 is tensioned by the elastic member 82. Therefore, the fixing ball 87 is prevented from being loose and has elastic force. A ball receiving groove 89 is formed on an outer circumference of the switch shaft 84. The fixing ball 87 is selectively fitted into the ball receiving groove 89. Therefore, unless the rotational force is applied to the switch protrusion 85-1 of the release bar 85, the release bar 85 is not changed in position due to the elastic force of the fixing ball 87 and is maintained in a fixed state.

Figure 6:
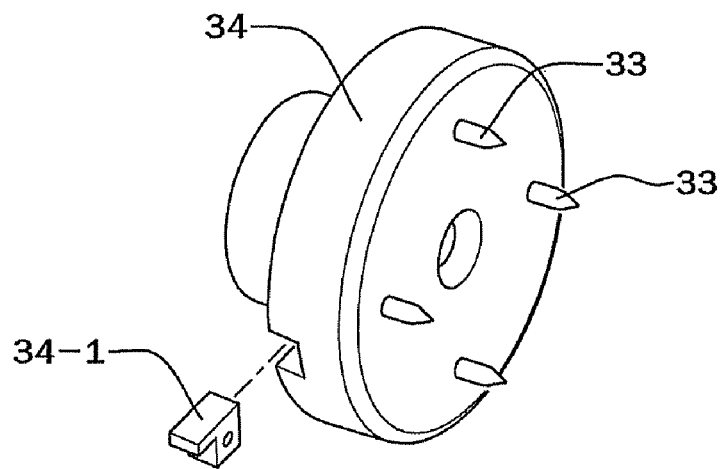
FIG. 6 is an exploded perspective view illustrating a motor disk and a return protrusion in the multi-turn hydraulic actuator.

Further, to change the mode of the actuator to the automatic mode, without any additional manipulation, a return protrusion 34-1 is attached to an outer circumference of the motor disk 34 as illustrated in FIG. 6. The return protrusion 34-1 protrudes outwardly. When the motor disk 34 is rotated by the operation of the hydraulic motor 30, the return protrusion 34-1 applies an impact to the switch protrusion 85-1 of the release bar 85 positioned in the horizontal state, so that the release bar 85 is rotated to the original state and simultaneously the automatic disk 60 is released from being pushed.

As illustrated in FIG. 3, magnets 75 facing each other in the same pole direction are respectively buried in the sides of the manual disk 70 and the handle disk 94 facing each other, so that the manual disk 70 and the handle disk 94 have resistance. At the moment when the release bar 85 returns to the original state and the automatic disk 60 is released from being pushed, the moving shaft 50 is pushed towards the motor disk 34. Therefore, the mode of the actuator is changed from the manual mode to the automatic mode by a simple method of operating the hydraulic motor 30, without any special manipulation, thereby providing the conveniences in use.

As illustrated in FIG. 1, a handle casing 91 is attached to the other side of the housing 20 of the drive part B. The manual handle 90 is positioned to be rotatable in the handle casing 91. When the mode of the actuator is changed to the manual mode, the manual handle 90 is to manually operate the worm shaft 43 so as to be rotated. In the manual handle 90, the handle disk 94 is installed at a front end of the handle shaft 92. A number of the rotation pins 93 are radially attached to the handle disk 94. The rotation pins 93 and the rotation pins 73 of the manual disk 70 selectively meet each other, so that the manual disk 70 is operatively rotated to make it possible to manually operate the worm shaft 43 to be rotated.

Figure 7:
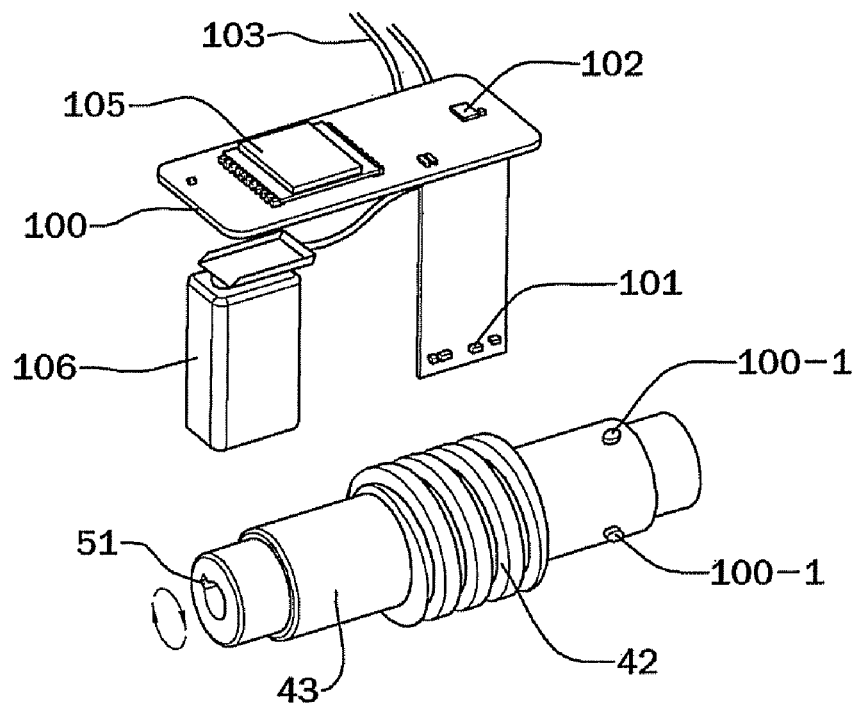
FIG. 7 is a separated perspective view illustrating a non-touch digital detector for detecting the extent of opening and a worm shaft in the multi-turn hydraulic actuator.
Figure 8:
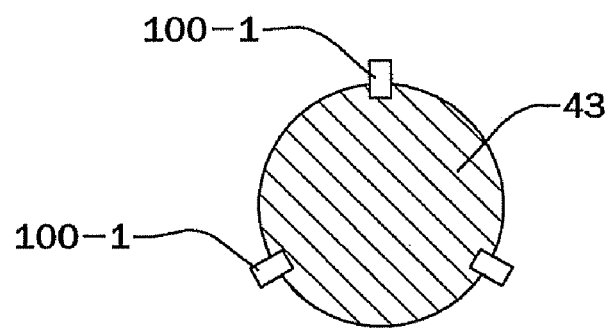
FIG. 8 is a side sectional view illustrating magnets for detecting the extent of opening, which are installed at the worm shaft in the multi-turn hydraulic actuator.

To dedicatedly detect the rotational direction, the rotational speed and the extent of opening of the worm shaft 43, the present invention provides a number of magnets 100-1 for detecting the extent of opening and a non-touch digital detector 100 for detecting the extent of opening, as illustrated in FIGS. 7 and 8.

As illustrated in FIG. 8, three magnets 100-1 for detecting the extent of opening are installed at an outer circumference of the worm shaft 43, at the equal intervals of 120 degrees in the circumference direction, along a spiral direction. The non-touch digital detector 100 for detecting the extent of opening includes hole sensors 101 for perceiving signals of the magnets 100-1 for detecting the extent of opening and is installed to be received in a detector receiving unit 25 formed in the housing 20 of the drive part B as illustrated in FIG. 2.

The hole sensors 101 perceive signals of the magnets 100-1 for detecting the extent of opening three times during the worm shaft 43 rotates once, so that the measurement thereof is more minute and precise. A special low-power processor 102 is installed on the top of the non-touch digital detector 100 and calculates the rotational speed, the rotational direction and the extent of opening of the worm shaft 43. After the low-power processor calculates these items, calculated results (signals) are transferred to the controller 13 installed in the operation part A or drive part B, through a signal line 103. The controller 13 directly receives the signals detected by the non-touch digital detector 100 for detecting the extent of opening and controls the operation of the hydraulic pressure generator 10.

Further, the controller 13 may output outwardly the signals detected by the non-touch digital detector 100 for detecting the extent of opening and simultaneously controls the operation of the hydraulic pressure generator 10 by control instructions from the outside.

Further, as illustrated in FIG. 7, a display 105 for displaying the extent of opening is assembled on the top of the non-touch digital detector 100 for detecting the extent of opening. The display 105 is capable of indicating the extent of opening by the power applied through the controller 13 of the operation part A at normal times and by the power applied through an additionally built-in battery 106 at the time when electricity fails. The display 105 is capable of easily setting/adjusting the accurate extent of opening by operating a button of the operation part A, without opening the housing.

The multi-turn hydraulic actuator according to the present invention can be installed in a narrow and small space. A user can install the operator part (the hydraulic pressure generator) in a space where it is easy to operate the multi-turn hydraulic actuator, without any limitation with respect to an installation place. Therefore, the multi-turn hydraulic actuator provides the effect of stably obtaining high outputs by using low power.

Furthermore, the multi-turn hydraulic actuator provides the effect of conveniently setting/adjusting the accurate extent of opening by operating only a button of the operation part A, without opening the housing when setting/adjusting the extent of opening, by using the non-touch digital detector for detecting the extent of opening.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A multi-turn hydraulic actuator comprising:
a hydraulic motor installed at a front end of one side of a housing of a drive part, to operate a motor disk so as to rotate by hydraulic pressure generated in a hydraulic pressure generator;
a decelerator installed in the middle of the housing of the drive part and including a worm, a worm shaft, a driving shaft and a worm wheel, wherein the worm shaft with the worm is installed to be rotatable, and the worm is engaged with the worm wheel connected to the driving shaft in a single unit, to reduce a speed of a rotational force of the worm and transmit the rotational force of the worm to the driving shaft at the reduced speed;
a moving shaft penetrating the worm shaft and connected to the worm shaft, to operatively rotate together and to selectively slide left or right;
an automatic disk connected to one side of the moving shaft and operatively rotated by a number of rotation pins selectively meeting rotation pins of the motor disk;
a manual disk connected to the other side of the moving shaft;

a manual mode switch including a release bar positioned between the motor disk and the automatic disk, wherein the release bar is pivoted when a manual mode button is operated and then the release bar moves the automatic disk so as not to interfere with the motor disk, to switch an automatic mode of the worm shaft to a manual mode; and a manual handle installed at the other side of the housing of the drive part and including a handle shaft, rotation pins and a handle disk, wherein the rotation pins of the handle disk installed at a front end of the handle shaft selectively meet rotation pins of the manual disk, to manually rotate the worm shaft.

2. The multi-turn hydraulic actuator of claim 1, wherein the hydraulic pressure generator is installed, in a single unit or a separate unit, at the housing of the drive part directly connected to a valve of a conduit or a lock of a channel.

3. The multi-turn hydraulic actuator of claim 1, wherein the manual mode switch comprises:
a manual switch housing installed adjacently to the motor disk and the automatic disk through the housing of the drive part;
a pusher elastically installed to move upward/downward inside the manual switch housing by elastic members and including an interference preventing groove formed in the middle of the pusher, pressing sides formed to be extended to both lower sides from the interference preventing groove, and the manual mode button installed on an upper surface of the pusher;
a switch shaft installed to be rotatable through the inside and outside of the manual switch housing and including a pivot piece formed to protrude from an inside front end of the switch shaft, wherein the pivot piece pivots by being pressed by the pusher; and
the release bar attached to an outside front end of the switch shaft and including a switch protrusion and a roller respectively positioned at the opposite ends of the release bar, wherein the roller pushes the automatic disk to be forcibly moved.

4. The multi-turn hydraulic actuator of claim 3, wherein the manual switch housing includes an elastic element receiving groove connected to the switch shaft, wherein a fixing ball is elastically installed by an elastic member forced by a set screw so that the fixing ball is prevented from being loose, wherein the fixing ball is fitted to be inserted into a ball receiving groove formed in an outer circumference of the switch shaft, so that the release bar is maintained in a fixed state.

5. The multi-turn hydraulic actuator of claim 1 or claim 4, wherein a return protrusion is formed to protrude outwardly at an outer circumference of the motor disk, wherein when the motor disk rotates as the hydraulic motor operates, the return protrusion applies an impact to the switch protrusion of the release bar positioned in a horizontal state so that the release bar returns to its original state.

6. The multi-turn hydraulic actuator of claim 5, wherein the manual disk and the handle disk include magnets facing each other in the same pole direction, so that the manual disk and the handle disk have resistance, wherein when the release bar returns to its original state and the moving shaft is released from being pushed, the magnets push the moving shaft towards the motor disk so that the actuator is automatically changed to the automatic mode.

7. The multi-turn hydraulic actuator of claim 1, further comprising:
a number of magnets for detecting the extent of opening, installed at an outer circumference of the worm shaft, at the equal intervals, along a spiral direction; and
a non-touch digital detector for detecting the extent of opening, installed to be received in a detector receiving unit formed in the housing of the drive part, wherein the non-touch digital detector includes hole sensors for perceiving signals of the magnets, to detect the rotational direction and the extent of opening of the worm shaft.

8. The multi-turn hydraulic actuator of claim 7, wherein the non-touch digital detector for detecting the extent of opening further includes a low-power processor and a display for indicating the extent of opening installed on the non-touch digital detector upper surface.

9. The multi-turn hydraulic actuator of claim 1, further comprising:
a controller provided in an operation part or drive part, wherein the controller controls the operation of the hydraulic pressure generator by directly receiving input signals detected by the non-touch digital detector for detecting the extent of opening or by outwardly outputting the signals detected by the non-touch digital detector for detecting the extent of opening and simultaneously receiving control instructions from the outside.

* * * * *